(12) United States Patent
Hedrick

(10) Patent No.: US 7,752,567 B2
(45) Date of Patent: *Jul. 6, 2010

(54) METHOD OF SYSTEM FOR VERIFYING ENTRY OF MANUALLY ADJUSTABLE DATA IN A MULTI-PARAMETER AIRCRAFT INSTRUMENT DISPLAY

(75) Inventor: Geoffrey S. M. Hedrick, Malvern, PA (US)

(73) Assignee: Innovative Solutions and Support, Inc., Exton, PA (US)

( * ) Notice: Subject to any disclaimer, the term of this patent is extended or adjusted under 35 U.S.C. 154(b) by 675 days.

This patent is subject to a terminal disclaimer.

(21) Appl. No.: 11/635,135

(22) Filed: Dec. 7, 2006

(65) Prior Publication Data

US 2007/0180394 A1 Aug. 2, 2007

Related U.S. Application Data

(63) Continuation of application No. 10/616,208, filed on Jul. 8, 2003, now Pat. No. 7,346,854.

(51) Int. Cl.
*G06F 3/048* (2006.01)
(52) U.S. Cl. ........................ 715/771; 715/767; 715/823; 701/14
(58) Field of Classification Search .................. 715/709, 715/710, 767, 771, 772, 815, 822–828; 701/1–23, 701/99, 116–124
See application file for complete search history.

(56) References Cited

U.S. PATENT DOCUMENTS 4,442,424 A 4/1984 Shirasaki et al.

(Continued)

FOREIGN PATENT DOCUMENTS

DE 38 34 229 A1 4/1989

(Continued)

OTHER PUBLICATIONS

IHAS 5000; Bendix/King Integrated Hazard Avoidance System; General Aviation's First Integrated Safety System; 5 pgs.

(Continued)

*Primary Examiner*—Ba Huynh
(74) *Attorney, Agent, or Firm*—Bryan Cave LLP

(57) ABSTRACT

A method and system for providing an easily recognizable visual feedback to a user in a multi-parameter aircraft instrument display, such as a flat panel display, of manually induced variations in individually selected manually adjustable data associated with a selected one of a plurality of displayable parameters in a simultaneous display of these parameters. The method and system provides visual confirmation of the parameter being manually varied in response to such manual variations by enlarging the display of the selected parameter, such as by zooming out the displayed image of the selected parameter to between two and four times its normal size in response to the manual variation of this parameter, and returns the image size to its original size, such as by zooming in, in response to a cessation in the manual adjustments by the user of the associated dimensional data, such as within a predetermined interval after such cessation, such as two to four seconds thereafter. A frame may be provided about the enlarged image to provide further visual confirmation to the user.

9 Claims, 2 Drawing Sheets

U.S. PATENT DOCUMENTS

| | | | |
|---|---|---|---|
| 5,121,112 A * | 6/1992 | Nakadozono | 340/870.16 |
| 5,636,145 A * | 6/1997 | Gorman et al. | 702/148 |
| 5,648,755 A * | 7/1997 | Yagihashi | 340/439 |
| 5,673,987 A | 10/1997 | Futschik et al. | |
| 5,844,504 A | 12/1998 | Etherington | |
| 5,847,704 A | 12/1998 | Hartman | |
| 6,057,786 A | 5/2000 | Briffe et al. | |
| 6,216,064 B1 | 4/2001 | Johnson et al. | |
| 6,330,497 B1 * | 12/2001 | Obradovich et al. | 701/1 |
| 6,466,235 B1 | 10/2002 | Smith et al. | |
| 6,812,942 B2 * | 11/2004 | Ribak | 345/30 |
| 6,909,439 B1 | 6/2005 | Amro et al. | |
| 2002/0085043 A1* | 7/2002 | Ribak | 345/810 |
| 2002/0099528 A1 | 7/2002 | Hett | |
| 2003/0132860 A1* | 7/2003 | Feyereisen et al. | 340/973 |
| 2004/0056895 A1 | 3/2004 | Hedrick | |

FOREIGN PATENT DOCUMENTS

| | | |
|---|---|---|
| DE | 40 31 870 A1 | 4/1992 |
| DE | 44 14 657 A1 | 11/1995 |
| DE | 195 00 668 A1 | 7/1996 |
| DE | 296 10 677 U1 | 9/1996 |
| DE | 196 15 249 A | 1/1997 |
| DK | 4031870 | 4/1992 |
| DK | WO 01/28803 | 4/2001 |
| FR | 2 729 345 | 7/1996 |

OTHER PUBLICATIONS

Aviation Today; Giant Steps Forward for GA; Jul. 1, 2000; http://www.aviationtoday.com; 7 pgs.

ISR for PCT/DE 00/03544; 3 pgs.

* cited by examiner

METHOD OF SYSTEM FOR VERIFYING ENTRY OF MANUALLY ADJUSTABLE DATA IN A MULTI-PARAMETER AIRCRAFT INSTRUMENT DISPLAY

CROSS-REFERENCE TO RELATED APPLICATION

This application is a continuation of commonly owned copending U.S. patent application Ser. No. 10/616,208, filed Jul. 8, 2003, entitled "Method and Apparatus for Facilitating Entry of Manually-Adjustable Data Setting in an Aircraft Cockpit", and naming Geoffrey S. M. Hedrick as the sole inventor thereof, and claims priority from U.S. Provisional Patent Application Ser. No. 60/394,591, filed Jul. 8, 2002, the contents of which are hereby incorporated by reference in their entirety.

BACKGROUND OF THE INVENTION

1. Field of the Invention

The present invention is directed to the display of manually entered data on a multi-parameter aircraft instrument display, such as a flat panel display, in which there are a plurality of simultaneously displayed parameters, and more particularly to a method and system of providing easily recognizable visual confirmation to the user that the correct parameter in the multi-parameter display is being manually varied.

2. Description of the Related Art

In the operation of an aircraft it is commonly necessary or desirable to manually set or adjust, and in some cases to periodically reset or readjust, a variety of course, instrument and environmental settings and parameters that are utilized in flight and ground operations. For example, the local barometric pressure may be set—initially using the local pressure measured at the airport when the aircraft is on the ground prior to takeoff and, at altitudes of less than 18,000 feet (flight level 180), thereafter from time-to-time to reflect changes in the local barometric pressure as the aircraft proceeds in flight—in order to provide the altimeter with an accurate reference against which to calculate changes in the aircraft altitude.

Prior art mechanical altimeters, typically implemented as discrete single-function instruments, include a pilot-graspable shaft-mounted knob that projects outwardly from the altimeter faceplate perimeter and which is selectively rotatable to enable manual setting, and resetting, of the local barometric pressure. Rotation of the knob changes the relative alignment of a numeric index scale with a pointer so that the pilot can, through such rotation, selectively adjust the scale to indicate that the current local pressure is, by way of illustration, 30.12 in. Hg. Because the numeric indications on the index scale are quite small and the consequences of an incorrect setting can be disastrous in certain situations, an unusual amount of pilot attention must be directed to the instrument when setting, or resetting, the altimeter adjustment. The potential for introducing inadvertent errors into the adjustment is understandably greater in flight, when the attention required to correctly effect the adjustment must come at the expense of the pilot's other responsibilities and workload in maintaining situational awareness and otherwise operating and controlling the aircraft.

Although these discrete mechanical altimeters are still commonly employed in the majority of smaller propeller-driven aircraft and, to a lesser extent, in small and larger jets and in other commercial aircraft, they are increasingly being replaced by digital flat panel displays (FPDs), and the associated control systems for providing the imaging data indicative of current aircraft altitude, on which the aircraft's current altitude is displayed for viewing and use by the pilot(s) and/or flight crew. In addition to current aircraft altitude the FPD will also typically continue to display the current local barometric pressure setting which has been manually input by the pilot or other user and on which the calculation of current aircraft altitude is based. That setting may be manually input, by way of illustrative example, through selective rotation of a rotatable knob or other user-manipulatable control that is expressly provided for that purpose, or via a keypad on which the numeric value of the local barometric. ("baro") pressure is entered, or by finger or stylus contact with a touch-sensitive pad or the surface of a touch-sensitive FPD. As with prior art mechanical altimeters, the current local pressure setting may, in any event, be periodically input or entered or adjusted with a high degree of accuracy, and thus, normally requires that the pilot devote special attention to assuring input of the correct setting, whether the aircraft is on the ground or in the course of flight.

The FPD on which the manually-input local barometric pressure setting is displayed, and on which the aircraft's current altitude is dynamically updated and displayed may be dedicated to providing that functionality alone, and can be implemented so that the FPD graphically depicts or simulates the appearance of a prior art mechanical altimeter with which all licensed pilots are familiar. Increasingly, however, the flight decks of large commercial passenger aircraft are provided with relatively large FPDs that display for the flight crew, in addition to aircraft altitude, a multiplicity of other types of aircraft status, flight, navigation and other aircraft and environmental data that is used in the operation and control of the aircraft. In either case, manual setting of the current local barometric pressure requires that special attention be directed and diverted to the FPD, on which the numeric pressure adjustment setting being entered or input is displayed among a crowded field of data and, in order to provide sufficient room to fit all of that data on the FPD, the barometric pressure setting is typically displayed in a relatively small format and/or numeric typesize, so that the pilot must devote unusual attention to the task of entering the desired setting in order to avoid inadvertent potentially-disastrous errors. This problem is especially apparent in multipurpose FPDs that concurrently display numerous different types of information and data to the aircraft pilot, thereby increasing the opportunity for a busy or task-overloaded pilot to inadvertently manipulate the wrong knob or control and/or to view the wrong onscreen data in entering the new setting, or in any event requiring that the pilot take more time and divert more attention to carefully effect the local barometric pressure setting adjustment than might otherwise be needed to do so.

SUMMARY OF PARTICULAR EMBODIMENTS OF THE INVENTION

In various embodiments, the invention provides methods, systems, and apparatuses for facilitating the manual adjustment or entry of data settings—such, by way of illustrative example, as the current local barometric pressure—in an aircraft cockpit or flight deck environment in which the data is digitally displayed on a flat panel display (FPD), such for example as a liquid crystal, display (LCD). In some embodiments, for example, the invention is equally applicable to a FPD that displays only the particular data or setting or information of interest—such as a dedicated, single-function digital FPD or LCD altimeter—as well as to a FPD that is operable to concurrently display a multiplicity of data or settings or information, among them the particular data or setting or information with respect to which the manual adjustment or setting is required. In some embodiments, the invention may also be applied to the setting of user-adjustable data that is not normally displayed or depicted on a FPD but which, in accordance with the invention, is imaged on the FPD for and during the adjustment or setting of the data. Moreover, the applicability of certain embodiments of the invention is unaffected by the specific manner in which the adjustment or entry of the setting is accomplished, whether through rotation or other user manipulation of a knob or like control element or surface, or by direct keypad entry of the data setting value, or via finger or stylus contact with a touch-control pad or surface or an FPD surface or faceplate, in another manner, or a combination thereof, for example.

Thus, in accordance with various embodiments of the invention, when the user-adjustable variable setting is to be entered or adjusted or selected, the area on the FPD at which the setting to be adjusted or entered is imaged or is to be shown, and/or within which the setting is to be selected or entered, may be predeterminately increased in size relative to its original, normal display size and relative to the overall size of the FPD. For example, the size may be doubled from that which in which the setting is normally displayed on the FPD during flight or other normal operation of the aircraft, in some embodiments. Where the particular data to which the setting relates is normally displayed in a window or otherwise in a predeterminately marked-off or separately delineated area on the FPD, in certain embodiments, the window or the like may be doubled (for example) in size. Where the data is normally displayed by a graphic or graphically-defined image—such as where the setting to be adjusted is the position of a "heading bug" on a graphically-depicted directional gyro ("DG") compass rose—the graphic or image (or that portion of the image at which the adjustment is being input, such as the relevant arcuate portion of the compass rose) may be doubled (for example) in size, in some embodiments. Where the data is normally displayed by alphanumeric characters, the typesize—and, optionally, the typeface or font—of the alphanumeric characters, in some embodiments, may be doubled (for example) in size and/or otherwise changed to instantly highlight that data and the adjustment thereof being entered.

Although this increase or enlargement in the displayed size of the relevant data or graphic may, and will, in many embodiments, result in the obscuring of other "underlying" information or data or images that are normally displayed on the FPD in the expanded area over which the enlargement has occurred, such obscurement may be only temporary (i.e. while the adjustment or new setting is entered or effected), in some embodiments. It is also within the intended scope and contemplation of some embodiments of the invention that, if desired, the temporarily enlarged data or graphic may be rendered predeterminately translucent so that the temporarily obscured data can be at least partially viewed through that portion of the enlarged data or image that would otherwise hide or obscure the "underlying" data.

As a result of the enlarged size of the displayed data or graphic, in many embodiments, the pilot can more easily view and enter or modify or select the new data setting. The attention of the pilot that must be directed to assuring an accurate manual adjustment of the data setting is thereby reduced, in some embodiments, relative to the other tasks and operations and work load to which the pilot must also devote his or her attention.

In a further aspect of some embodiments of the invention, the setting being input or adjusted may instead or additionally be displayed, on the FPD, in the enlarged condition, on a graphical scale or in another manner that indicates to the viewer the new data setting value being input relative to the range of values to which the setting may be adjusted. For example, when the local barometric pressure setting is to be input or adjusted to 30.22 in. Hg, an enlarged graphical scale may be displayed on the FPD in some embodiments, and, upon entry or adjustment or selection of the pressure value 30.22, the display may graphically show that a value approximately midway along the scale, a relatively small amount greater than the "standard" barometric pressure of 29.92 in. Hg, has been entered or selected, for example. In various embodiments, this permits the pilot to quickly and easily verify that the correct and intended setting has been entered—first, by providing an enlarged, graphical display that enhances the pilot's awareness of the scale for the relevant data and of the particular value (in relation to that displayed scale) that has been set through the use of an intuitive graphical representation, and, second, in some embodiments, by therefore not requiring that the pilot divert undue attention from other ongoing efforts or activities or needs in the aircraft cockpit or flight deck. The pilot's attention may thus be quickly and accurately drawn to that location on the FPD screen at which the data entry is to be effect, and/or at which the current and/or new data value is shown, in many embodiments, thereby minimizing the amount of time required to complete the data setting or adjustment procedure or operation, as examples.

The event trigger or initiator of the enlargement in size (and of the optional graphical or other scale-like depiction of the setting value range) of the relevant data on the FPD can, in accordance with some embodiments of the invention, be implemented in a suitable manner, and, in some cases, as may be or be deemed appropriate for or dictated by the particular manner in which the setting adjustment is manually effected, for instance. For example, where a rotatable or otherwise displaceable knob or other manipulatable control is provided, such as to adjust the local barometric pressure setting, pilot contact with or manipulation of the control can automatically initiate the predetermined enlargement in size and optional scale display. In this manner the pilot immediately obtains feedback and awareness that he or she has initiated (or is about to initiate) a change or adjustment of the local barometric pressure setting, for example, eliminating uncertainty in some embodiments as to whether the proper control, has been grasped or selected or identified for making the adjustment and highlighting on the FPD, by way of the enlargement, the data adjustment being entered or effected. Since the new data setting can be entered more quickly and easily, in many embodiments, the pilot's workload and stress level are effectively reduced. The display of a graphical scale or the like showing the relative location of the, new data setting among and along the appropriate range for that data further enhances the pilot's understanding and awareness of the entered data setting, in some embodiments, and thereby enables rapid confirmation that the correct and intended setting has been entered, for example. These advantages result in an overall enhancement in aircraft operational safety, in many embodiments.

It is also intended that the image enlargement (and optional scale), once effected by pilot contact with or manipulation of the appropriate control (or otherwise) for the particular data, may be maintained on the FPD for a predetermined period of time after adjustment of the data value setting or adjustment has been completed, in some embodiments. For example, where the adjustment is effected by user manipulation of a rotatable knob or contact with another control or surface, or through direct user data entry on a physical or image-simulated keypad, the enlargement (and optional scale) may, by way of illustration, be maintained on the FPD screen for a period of 2 seconds after no further manipulation or contact of the input or adjustment control by the user is sensed, for instance. This brief delay in returning the data image to its original, normal, non-enlarged size provides, in some embodiments, an additional opportunity for the pilot or other user to view the entered data and thereby confirm—even if necessary to momentarily look away from the display to perform some other aircraft control function or operation after the data has been entered—that the correct and intended data has been entered.

Other benefits and features of the present invention may become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF EXAMPLES OF EMBODIMENTS

Figure 1:
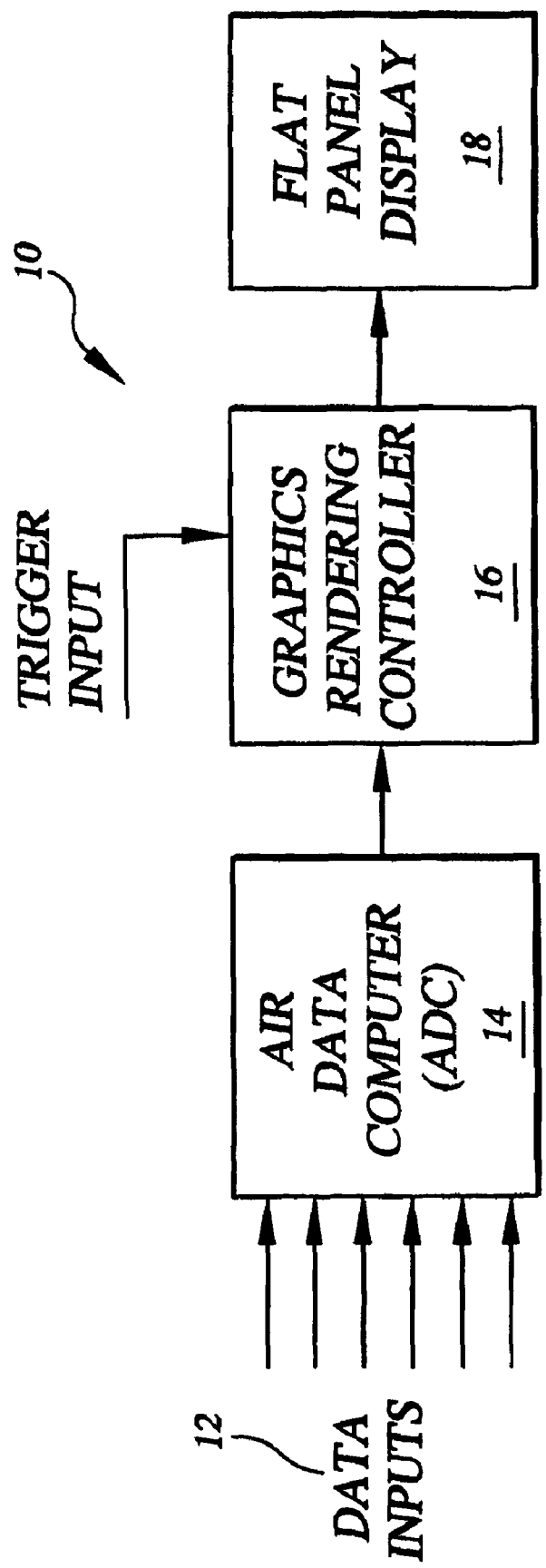
FIG. 1 is a block diagram of an aircraft cockpit instrumentation display system implementing an example of an embodiment of the present invention.

FIG. 1 depicts an instrumentation display system 10 for use in an aircraft cockpit and in which various embodiments of the invention may be implemented. Those skilled in the art will recognize, based on this disclosure and an understanding therefrom of the teachings of the invention hereof, that the particular hardware and devices that form the display system 10, and the general display functionality provided by and incorporated therein, may vary in different embodiments of the invention. It is contemplated and intended that certain embodiments of the invention are implemented by way of software programming to provide particular advantageous functionality and, moreover, such programming can take various forms within the inventive scope. Accordingly, the particular system components shown in FIG. 1 are intended to provide an illustrative example of such apparatus so as to facilitate a full and complete understanding and appreciation of the various aspects and functionality of particular embodiments of the invention as realized in method and apparatus embodiments thereof.

The display system 10 of FIG. 1 may be of a type typically found in a commercial aircraft. Data inputs 12 from onboard aircraft and environmental sensors, from received ground-based and other data-linked transmissions to the aircraft, from a variety of monitoring and computing devices and equipment aboard the aircraft, and from other sources of relevant information (as is well known in the art) which is displayed or which contributes to information displayed in the aircraft cockpit to assist the flight crew in the operation of the aircraft are ultimately input to an air data computer (ADC) 14, for example. Air data computers may perform a host of data processing and control functions related to the flight and operation of the aircraft, many of which may be unrelated to the subject matter and functionality of the present invention. Of relevance here, for example, is that the air data computer outputs data signals to a graphics rendering controller or computer 16, in some embodiments, that is operable to receive the data signals and render therefrom electrical signals to present on a connected flat panel display (FPD) 18 graphically-depicted information for use by a pilot in operating the aircraft. The FPD 18 may be disposed in the aircraft cockpit in a location selected for ready viewing by the pilot(s) and flight crew, and may present on a single large display screen, in various embodiments, a wide variety of information and data including, inter alia, primary data required for constant viewing and use by a pilot to maintain control of the aircraft and secondary data relating to, by way of illustrative example, fuel loads, electrical system status, hydraulic pressures and en route leg and estimated destination times. Such multipurpose FPDs may thus present, in various embodiments, a multiplicity of information and data intermixed in and among a crowded field.

The functionality of the present invention may be implemented in the graphics rendering computer 16, for example. As discussed herein, in various embodiments, the invention provides a predetermined enlargement in the depicted size of data or indications that are normally presented in a relatively smaller size on the display 18 when a variable, user-adjustable setting related to the data or indications is to be entered or adjusted or selected by a pilot or other user, for instance. The graphics rendering computer 16 may be accordingly provided with a trigger input 20, in some embodiments, that signals to the graphics processor that the particular data or indication to which the adjustment relates is to be enlarged in size. Upon receipt of the trigger, in many embodiments, the graphics rendering computer 16, via the electrical signals that it directs to the display 18, may cause the particular data or indication to be predeterminately enlarged in size on the display, for example. In certain forms of the invention, the data or indication remains predeterminately enlarged, for instance, for at least as long as the data adjustment or adjustment continues. Thus, where the adjustment is of the local barometric pressure setting, for example, the alphanumeric or other representation of the local barometric pressure setting value on the display 18 may be and may remain predeterminately enlarged during the entire period in which the adjustment is being made, in some embodiments. In certain embodiments, the enlarged data or indication representation on the display may be further maintained for an additional time period following completion of the adjustment, for example, an additional interval in the range of approximately 2 to 4 seconds. The graphics rendering computer 16 can also operatively provide, in some embodiments, that the enlarged data or indication on the display 18 be presented in a translucent or semi-translucent manner so as to permit pilot viewing of other data and indications and images on the display over which the enlarged data or indications appear during the adjustment and any time-out interval, for instance. In some embodiments, such translucency can be effected by suitable manipulation of the electrical signals directed from the rendering computer 16 to the display 18.

The particular hardware utilized to provide the advantageous functionality of the invention may vary in different embodiments. In particular embodiments, certain relevant functions provided in some embodiments by the air data computer 14 can instead be provided by a data processor or incorporated into a suitably-programmed graphics rendering controller or computer, for example. In some implementations of the invention, as for example in general aviation (e.g., noncommercial) aircraft or in applying some embodiments of the invention to single-use or limited scope multi-used displays in which significant manipulation of and computations with raw sensor data is not required, the functionality of air data computer 14 may perhaps be dispensed with entirely, or replaced with a suitable hardware interface between the sensor(s), for example, and the rendering computer or controller 16. Similarly, in some embodiments, the rendering computer 16 can take another appropriate form so long as it contains suitable software instructions or programming—or, in some embodiments, dedicated hardware circuitry and/or components—configured or prepared for providing certain inventive functionality and operations as herein disclosed. The display 18 can be one of various types of display, for example, a flat panel display and, moreover, in some embodiments, the invention can be implemented in a head-up display system in which the displayed data is projected into the view of the aircraft pilot from a projector or other display surface that may or may not be directly visible to the pilot.

Figure 2:
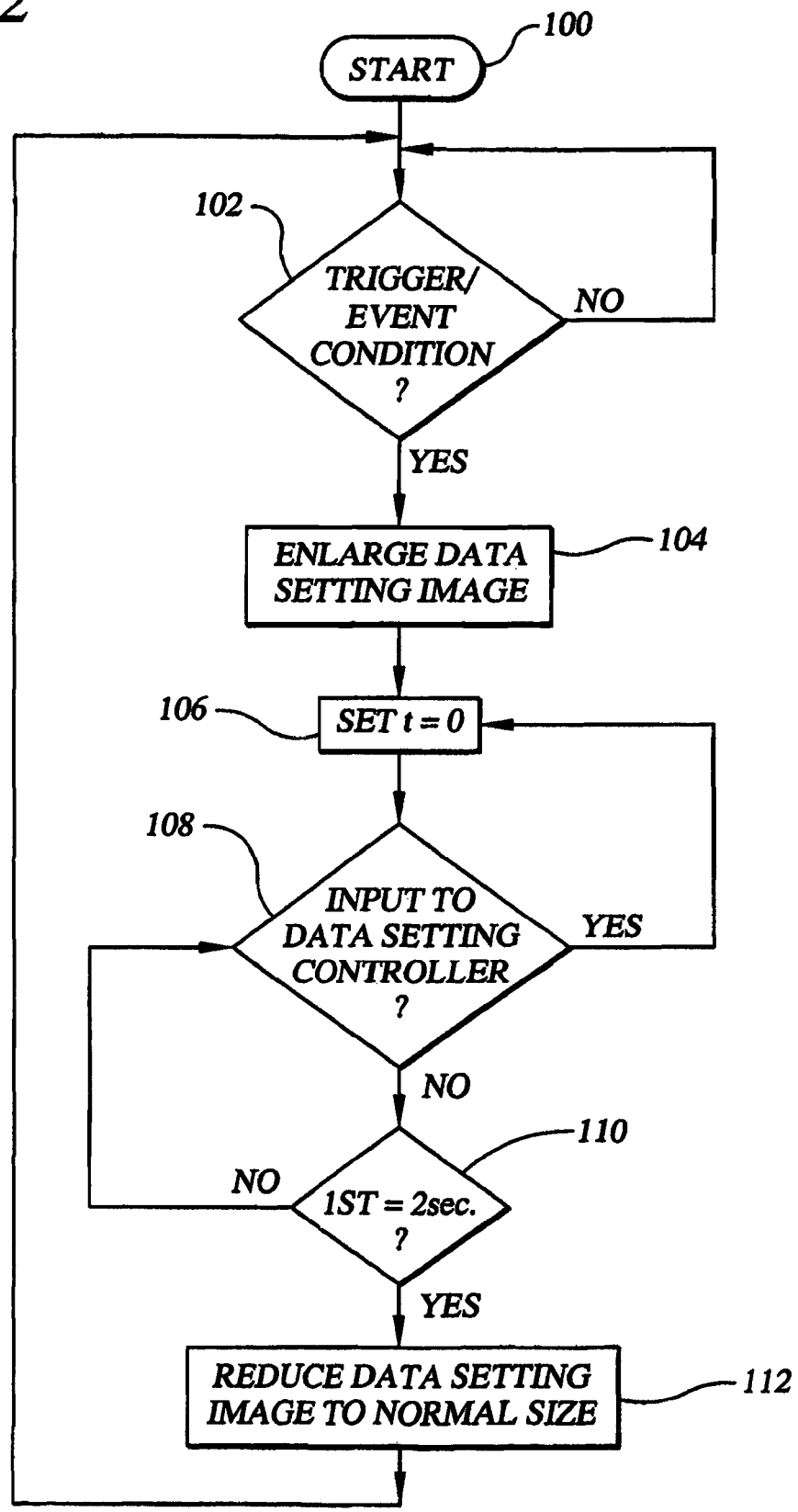
FIG. 2 is a flow chart of a method for facilitating entry of manually-adjustable data settings in an aircraft cockpit in accordance with an example of an embodiment of the invention.

The flow chart of FIG. 2 presents an example of an inventive method in accordance with an embodiment of the invention. For ease of explanation, and without intending to limit the contemplated scope or utility of the invention, it is assumed in discussing FIG. 2 that the data to be adjusted or entered is the current local barometric pressure.

At the start 100 of the FIG. 2 procedure, a determination is made at test 102, for instance, whether a predetermined trigger event or condition has occurred. For setting or adjustment of the local barometric pressure, that trigger event may, by way of example, be pilot contact with or displacement of a rotatable knob, for instance, with which the setting is adjusted, or toggling or actuation of a switch (either separate from or associated with a knob or other manipulatable data-adjustment control), or selection of a barometric pressure setting entry mode, or pilot contact with a keypad or pressure-sensitive pad or with a predetermined portion of a touch-sensitive display screen or other control or control, surface for adjustment of that setting. In various embodiments, the test 102 may be continuously repeated until occurrence of the predetermined trigger event has occurred, in response to the detection of which the graphics rendering processor causes (step 104) the depiction of the local barometric pressure on the display to be enlarged in a predetermined manner, for example. That enlargement may, for example, be a doubling in size, and may additionally include the presentation of a high-contrast frame or outline around the depicted setting, and/or a change in color, and/or the presentation of a graphical scale to further assist in entry of the intended new or adjusted value, and/or a change in the relative translucency of the presented setting or indication, and/or another suitable depiction for the particular data and application.

With the data or indication enlarged, at step 106, in the embodiment illustrated, an ascending or count-up timer may be initialized. A determination is then made (step 108), in some embodiments, as to whether there is continued input to the data setting controller—e.g., whether the trigger event or condition has reoccurred or continued. If so, then the timer is reinitialized at step 106, in some embodiments, and the test at step 108 is repeated, in certain embodiments, until it is determined that further data entry or adjustment (i.e. the trigger condition) has ceased, for instance. In some embodiments, at that point the value of the timer is tested (step 110) to determine whether the predetermined time-out interval—in this example assumed to be 2 seconds since timer initialization—has been met. If not, in various embodiments, the test at step 108 is repeated. If, on the other hand, the timer reveals that the time-out interval of 2 seconds has elapsed since the timer was last initialized, then, in some embodiments, at step 112 the graphics rendering computer causes the display to return the depicted indication of local barometric pressure to its normal, unenlarged size and condition, for example. The method then returns to the test of step 102, in some embodiments, to again await receipt of a further trigger event or condition.

As may be apparent to those skilled in the relevant art, the use in the foregoing description of the local barometric pressure as the data setting being adjusted and displayed is intended to be an example only, and the invention may also or alternatively be applied to numerous other pilot-adjustable or enterable settings and parameters and data and information that is displayed on an aircraft cockpit FPD or the like for use in the operation and control of the aircraft. For example, it is common in the operation of an aircraft to periodically adjust or reposition the so-called "heading bug" that a pilot may use to indicate, relative to the dynamically-changing DG heading indicator, the intended direction or course of flight. Thus, in some embodiments, a window or other portion of the FPD screen may, in accordance with the invention, be enlarged or increased in size—as for example by a factor of two—as and when the heading bug is repositioned by pilot manipulation of a control that is provided or used for that purpose. It is similarly common to readjust, from time to time, the DG relative to an onboard calibrated compass to periodically correct for gyroscopic precession as an aircraft proceeds in flight so that the heading displayed by the DG properly corresponds to that shown or provided by the compass. Here to, a window or other portion of the FPD screen may, in some embodiments, be enlarged or increased in size for and during such adjustment. Other pilot-settable data adjustments and entries that are commonly made in an aircraft cockpit relate by way of illustrative example to decision height, target altitudes, communication frequencies and reference airspeeds, as examples, and these and numerous other such data adjustments and entries may be the subject of the advantageous functionality of various embodiments of the present invention.

Thus, while there have shown and described and pointed out various novel features of the invention as applied to particular embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in another disclosed or described or suggested form or embodiment, which in some cases may be as a general matter of design choice. It is the intention, therefore, to be limited only as indicated by the scope of the claims appended hereto.

What is claimed is:

1. A method for providing an easily recognizable visual feedback to a user in a multi-parameter aircraft instrument display of manually induced variations in individually selected manually adjustable dimensional data associated with a selected one of a plurality of displayable parameters in said multi-parameter aircraft instrument display, said multi-parameter aircraft instrument display containing a plurality of said displayable parameters in a simultaneous visual display thereof, each of said parameter displays varying in accordance with a selected one of a plurality of manual adjustments of said dimensional data associated therewith for providing variations in said dimensional data, each of said individually selectable parameters having a unique associated visible indicia which uniquely visually identifies a particular one of said individually selectable manually variable parameters as being associated with a particular one of said plurality of displayable parameters; said method comprising the step of providing visual confirmation that the correct parameter in said multi-parameter display which the user intends to vary is having its associated dimensional data manually varied, said visual confirmation being provided by visually enlarging the display of said selected one of said simultaneously displayed parameters with respect to said non-selected simultaneously displayed parameters from an original normal display size in said display for a predetermined time period in response to said manual adjustments of said dimensional data associated therewith; whereby the user may easily recognize whether the correct parameter is being manually varied, said method further comprising the steps of visually reducing the display of said selected one of said simultaneously displayed parameters back to its original normal display size after said predetermined time period in response to a cessation in said manual adjustments of said dimensional data associated therewith, said predetermined time period being dependent on a continuation of said manual adjustments of said dimensional data associated with said displayed parameter being varied, initializing a predetermined timing sequence in response to said visually enlarging of said display of said selected one of said simultaneously displayed parameters and continuing to iteratively determine if said manual adjustments of said selected one of said parameters are continuing during said predetermined timing sequence in order to reinitialize said predetermined timing sequence each time said iterative determination indicates said manual adjustments to be continuing until said manual adjustments cease, said predetermined time period of said enlargement being determined by said cessation in said manual adjustments and comprising said initialized predetermined timing sequences which comprise said iterative determination.

2. A method in accordance with claim 1 wherein said step of providing visual confirmation comprises the step of zooming out the image size of said selected one of said simultaneously displayed parameters for visually enlarging the display thereof.

3. A method in accordance with claim 1 wherein said step of visually reducing the display of said selected one of said simultaneously displayed parameters back to its original normal display size comprises the step of zooming in the image size of said selected one of said visually displayed parameters.

4. A method in accordance with claim 2 wherein said step of zooming out the image size comprises the step of zooming out said image size to approximately twice its original normal display size.

5. A method in accordance with claim 1 further comprising the step of providing an image frame around said enlarged display of said selected one of said parameters for enhancing said visual confirmation.

6. A method in accordance with claim 1 wherein said predetermined time interval is within the range of approximately two to four seconds.

7. A method in accordance with claim 1 wherein said aircraft instrument display is a flat panel display.

8. A multi-parameter aircraft instrument display system for providing an easily recognizable visual feedback to a user of manually induced variations in individually selected manually adjustable dimensional data associated with a selected one of a plurality of manually adjustable displayable parameters, said system comprising a multi-parameter aircraft instrument display, said multi-parameter aircraft instrument display comprising a plurality of displayable parameters in a simultaneous visual display thereof; means for individually manually adjusting said dimensional data associated with each of said parameter displays; means for varying each of said parameter displays in accordance with a selected one of a plurality of said manual adjustments of said dimensional data associated therewith for providing variations in said dimensional data, each of said individually selectable parameters having a unique associated visible indicia which uniquely visually identifies a particular one of said individually selectable manually variable parameters as being associated with a particular one of said plurality of simultaneously displayable parameters; and means for providing visual confirmation that the correct parameter in said multi-parameter simultaneous display which the user intends to vary is having its associated dimensional data manually varied, said visual confirmation means comprising means for visually enlarging the display of said selected one of said simultaneously displayed parameters with respect to said non-selected simultaneously displayed parameters from an original normal display size in said display for a predetermined time period in response to said manual adjustments of said dimensional data associated therewith; whereby the user may easily recognize whether the correct parameter is being manually varied, said visual confirmation means further comprising means for visually reducing the display of said selected one of said simultaneously displayed parameters back to its original normal display size after said predetermined time period in response to a cessation in said manual adjustments of said dimensional data associated therewith, said predetermined time period being dependent on a continuation of said manual adjustments of said dimensional data associated with said displayed parameter being varied, said multi-parameter aircraft instrument display comprising means for initializing a predetermined timing sequence in response to said visually enlarging of said display of said selected one of said simultaneously displayed parameters and means for continuing to iteratively determine if said manual adjustments of said selected one of said parameters are continuing during said predetermined timing sequence in order to reinitialize said predetermined timing sequence each time said iterative determination indicates said manual adjustments to be continuing until said manual adjustments cease, said predetermined time period of said enlargement being determined by said cessation in said manual adjustments and comprising said initialized predetermined timing sequences which comprise said iterative determination.

9. A system in accordance with claim 8 wherein said means for visually enlarging the display of said selected one of said simultaneously displayed parameters comprises means for zooming out said image size to approximately twice its original normal display size.

* * * * *